United States Patent Office 3,482,967
Patented Dec. 9, 1969

3,482,967
BRAZING ALLOY
Thomas K. Redden, Cincinnati, Ohio, assignor to General
Electric Company, a corporation of New York
No Drawing. Filed Oct. 22, 1965, Ser. No. 502,273
Int. Cl. C21c 19/00
U.S. Cl. 75—171                     3 Claims

ABSTRACT OF THE DISCLOSURE

A Ni base-Cr-Si type brazing allow for use with oxide dispersion strengthened nickel base superalloys includes sufficient amounts and a careful balance of the elements W or Mo or both to inhibit interdiffusion of Cr from the brazing alloy and Ni from the superalloy, as well as to act as solution strengtheners of the brazing alloy and to limit formation of the lower melting NiCr (Mo, W) complex. B is effectively absent to avoid erosion of the base metal and the formation of a low melting eutectic. The element C is limited to avoid gas evolution and delamination.

---

This invention relates to high temperature brazing alloys and, more particularly, to a nickel base brazing alloy for use in brazing oxide dispersion strengthened nickel base superalloys.

In order to improve the mechanical properties of such superalloys as the nickel base alloys so that they can be useful at higher temperatures, there has been developed a series of oxide dispersion-strengthened superalloys. One of the more widely known forms of this material is TD-Nickel high temperature alloy announced by E. I. duPont de Nemours and Company. In one form, this material is a thoria dispersioned strengthened nickel base alloy having outstanding high temperature characteristics in the range of 1800–2400° F.

The manufacture of components from TD-Nickel alloy material such as for use in advanced apparatus generally requires the joining of one component to another. Any joining process which involves melting of the material tends to destroy the thoria dispersion and is detrimental to the improved strength of the material. Techniques such as electron beam welding and tungsten inert arc welding have resulted in severe agglomeration of the thoria and a drastic loss in the strength of the joint. Therefore, high temperature brazing is attractive as a joining method provided efficient joints can be obtained. High temperature brazing appears to be quite suited to oxide dispersion strengthened nickel base superalloys since such nickel base alloys may be heated to near their melting point without serious effect on properties.

It is a principal object of the present invention to provide an improved brazing alloy for joining oxide dispersion strengthened nickel base superalloys through brazing at a temperature which is below that which would detrimentally affect the metallurgical and chemical properties of the alloy.

Another object is to provide a nickel base brazing alloy suitable for use with TD-Nickel alloy material and which can be brazed at a temperature of up to about 2400° F. for operation at a temperature of up to about 2200° F.

These and other objects and advantages will be more readily understood from the following detailed description and examples which are meant to be exemplary of rather than any limitation on the scope of the present invention.

It has been found that the above objects can be attained with a brazing alloy based on the element nickel and having a balance between at least one of the elements molybdenum and tungsten and the element chromium which provides the brazing alloy with oxidation resistance. More specifically, one form of the brazing alloy of the present invention consists essentially of, by weight, 15–25% Cr; at least one element selected from the group consisting of Mo and W, the Mo when selected being in the range of 9–30%, the W when selected being in the range of 5–15% and the sum of the Mo and W being in the range of 22% to less than 35%; about 2–10% Si; a maximum of 300 parts per million carbon; with the balance essentially nickel and incidental impurities. In addition, it has been found that a portion of the nickel can be replaced with iron or cobalt or both up to about 20% without detrimentally effecting the alloy or the effect of the balance between chromium and the elements tungsten and molybdenum.

A typical analysis of one form of TD-Nickel 0.05" thick sheet, by weight, is about 2.2% thoria, up to about 0.009% carbon, about 0.01% each of Fe, Cr and Co, and about 0.001% each of Ti, Cu and S. Thus the composition of TD-Nickel nominally is 2 weight percent thoria with the balance nickel.

In order to provide a brazing alloy which can be used to braze in the range of 2000–2400° F., it was desirable to include the element chromium to provide oxidation resistance. Unforutnately, however, it was found that oxidation appears at a brazing alloy-base metal interface diffusion zone more rapidly when the brazing alloy includes chromium. At operating temperatures in the range of 2200–2300° F., TD-Nickel componentes brazed with a nickel base brazing alloy including chromium were subject to rapid diffusion of the chromium into the TD-Nickel base metal and the concurrent rapid diffusion of some of the nickel into the brazing alloy. This relatively rapid interdiffusion resulted in the formation of voids along that interface.

It has been found according to the present invention that the addition of at least one of the elements molybdenum and tungsten in the proper proportions will block the diffusion of chromium into the relatively pure nickel base metal and the diffusion of nickel into the brazing alloy. Any diffusion that does occur through the use of the brazing alloy of the present invention occurs on a slow uniform front so that void formation is prevented. At the same time the elements Mo and W provide the side benefit of solution strengthening of the brazing alloy. The addition of a total of from about 22% up to less than 35% of the elements W and Mo will effectively block the interdiffusion of chromium and nickel. As will be shown later, the inclusion of 35% or more total amounts of molybdenum and tungsten appear to promote erosive effect between the brazing alloy and the base metal. Furthermore, the amounts of molybdenum and tungsten are selected to limit the formation of the lower melting point complex NiCr(Mo, W).

It was further recognized that because of the very low carbon content of such oxide dispersion strengthened alloys as TD-Nickel and the generally substantial amount of carbon in brazing alloys, there was a strong tendency for carbon to diffuse rapidly from the brazing alloy into the oxide dispersion strengthened base material resulting in gas evolution and delamination. The alloy of the present invention includes no more than about 300 parts per million of carbon to prevent the occurrence of excessive carbon diffusion and delamination in the base metal being joined. Delamination occurs principally after brazing through the reaction of carbon with such elements as oxygen to form gases. This ruptures the TD-Nickel base metal.

The element silicon is included in the brazing alloy of the present invention to control melting point. It has been found that up to about 10% silicon can be included without deleterious side effects. Hence the alloy of the present invention includes about 2–10 weight percent silicon. As will be shown later in connection with the tables, the elements palladium and boron are sometimes included in other brazing alloys to control temperature. However with oxide dispersion strengthened Ni-base alloys, palladium causes severe erosion. Boron, in addition to causing erosion, forms a low melting eutectic with nickel at about 1750° F., too low for operating service in the desired range of up to 2200° F. Through the use of Si in the range of the present invention, the melting point of the brazing alloy can be selected and controlled between about 2150–2450° F. with about 2–4% silicon controlling the alloy within the specifically preferred range of about 2350–2400° F.

Thus the present invention provides a brazing alloy which is a careful balance of elements. This balance allows the formation of a sound brazed joint with a base metal of the oxide dispersion strengthened nickel base type such as TD-Nickel.

II relates the alloy of Example 1, even at a high temperature of 2375° F. showed lower erosion and no diffusion zone after 1 hour of testing compared with at least about 3 times the total reacted thickness of the nickel-silicon-boron type brazing alloy.

The metallographic evaluation data from subsequent tests on brazed samples oxidized at 2000° F. for 100 hours will be further descriptive of the range of the alloy of the present invention. In subsequent testing, the alloy of Example 4 proved to have the best combination of oxidation resistance, erosion resistance and narrow range melting point. In the evaluation of Examples 4 through 10, inclusive, it is to be noted that Examples 7, 9 and 10 are outside the range of the present invention and Example 5 is at 35% Mo+W or just beyond the upper limit of the sum of molybdenum and tungsten.

TABLE III.—METALLOGRAPHIC EVALUATION AFTER SAMPLES OXIDIZED AT 2,000° F. FOR 100 HOURS

| Example | Erosion | Oxidation resistance | Delamination | Voids | Other |
|---|---|---|---|---|---|
| 4 | Good | Good | None | None | |
| 5 | Severe | | Under T | Some | |
| 6 | Good | Fair | None | | |
| 7 | Very severe | Internal | | | |
| 8 | Good | Fair | None | | |
| 9 | Good | Poor | | | Second phase along diffusion zone. |
| 10 | Severe | do | | | Poor flow. |

In the evaluation of the alloy of the present invention a number of varieties of kinds of brazing alloys were prepared. The composition of some of the alloys melted and tested are shown in the following Table I.

TABLE I.—WEIGHT PERCENT (BALANCE Ni)

| Example | Cr | Mo | W | Si | Fe | Co | Al | Pd | B | Li |
|---|---|---|---|---|---|---|---|---|---|---|
| 1 | 16 | 17 | 5 | 4 | | | 1 | | | |
| 2 | 22 | 9 | | 4 | 22 | 1.5 | | | | |
| 3 | 16 | 17 | 5 | 4 | | | | | | |
| 4 | 16 | 25 | 5 | 4 | | | | | | |
| 5 | 16 | 30 | 5 | 4 | | | | | | |
| 6 | 16 | 9 | 15 | 4 | | | | | | |
| 7 | 22 | 9 | 0.5 | 2 | 20 | 1.5 | | | | |
| 8 | 16 | 17 | 5 | 2 | 6 | | | | | |
| 9 | 33 | | | | | | | 25 | | |
| 10 | 25 | 15 | | | | | | 20 | | |
| 11 | | | | | | | | 60 | 0.05 | 0.2 |
| 12 | | | | 3.5 | | | | | 1.9 | |
| 13 | | | | 4.5 | | | | | 2.9 | |

The alloys of Examples 9, 10 and 11 were tested to evaluate the effect of palladium on a nickel base alloy with or without substantial amounts of chromium and, in Example 10, with an amount of molybdenum to inhibit interdiffusion between the nickel base metal and the brazing alloy. Examples 12 and 13 are typical commerically available brazing alloys of the nickel-silicon-boron type.

One of the early evaluations to determine the effect of certain known and available brazing alloys on the erosion of TD-Nickel included an erosion cup test, the data for which is shown in Table II. The erosion cup was fabricated from 0.025″ sheet. Cups with 2–3 grams of brazing alloy were heated for 1 hour at their respective brazing temperatures.

TABLE II.—EROSION AND DIFFUSION DATA

| | Brazing temp. (° F.) | Erosion (mils) | Diffusion zone (mils) | Total reacted thickness (mils) |
|---|---|---|---|---|
| Example: | | | | |
| 11 | 2,250 | 25+ | 0 | 25+ |
| 12 | 2,000 | 7 | 14 | 21 |
| 13 | 1,950 | 7 | 7 | 14 |
| 1 | 2,375 | 5.5 | 0 | 5.5 |

The reactive nature of the elements palladium and boron in promoting the erosion and diffusion between the brazing alloy and the TD-Nickel erosion cup is readily seen from Table II. Although erosion data will be discussed in additional detail later, in tests to which Table II relates the alloy of Example 1, even at a high temperature of 2375° F. showed lower erosion and no diffusion zone after 1 hour of testing compared with at least about 3 times the total reacted thickness of the nickel-silicon-boron type brazing alloy.

A comparison between Example 4 including 25% Mo and Example 5 including 30% Mo with the same other ingredients shows that a small increase in the amount of molybdenum and tungsten outside the range of the present invention results in severe erosion and the creation of voids. However, just slightly below the maximum sum of 35% of Mo and W can result in an alloy which is unexpectedly better than any of the others tested and is a preferred form of the present invention represented by Example 4.

As shown in Example 7, with an insufficient amount of the elements Mo and W, the chromium is allowed to diffuse rapidly into the base metal causing very severe erosion. In Examples 9 and 10 in which palladium is included for control of melting point along with some oxidation resistance, it is seen that brazing alloys of unsatisfactory oxidation resistance result. The additional presence of molybdenum in such forms can result in a severe erosive condition.

Thus the present invention, which counterbalances the normally erosive characteristics of chromium by a proper amount of at least one of the elements molybdenum and tungsten, results in a brazing alloy unusually useful at elevated temperatures.

As another example of the benefits derived from the balance of elements of the present invention is the narrow melting range which can be achieved through the alloy of the present invention. The following Table IV shows the percent of brazing alloy melting at the temperature shown.

TABLE IV.—PERCENT OF ALLOY MELTING AT TEMPERATURE

| | 2,300° F. | 2,350° F. | 2,400° F. | 2,500° F. |
|---|---|---|---|---|
| Example: | | | | |
| 4 | 0 | 100 | 100 | 100 |
| 5 | 2 | 80 | 100 | 100 |
| 6 | 5 | 95 | 100 | 100 |
| 7 | 0 | 20 | 90 | 100 |
| 8 | 2 | 85 | 100 | 100 |
| 9 | 0 | 75 | 100 | 100 |
| 10 | 0 | 40 | 100 | 100 |

As was mentioned above, the preferred form of the present invention, Example 4, has a very narrow melting band between 2300 and 2350° F. as seen in the above Table IV. This is to be compared with the relatively broad bands of alloys 7, 9 and 10 which are outside the scope of the present invention.

Although the present invention has been described in connection with a number of specific examples, it will be understood by those skilled in the art, the variations and modifications of which this invention is capable.

What is claimed is:

1. A nickel base brazing alloy particularly suitable for use with oxide dispersion strengthened nickel base alloys at temperatures in the range of about 2000–2400° F. consisting essentially of, by weight: 15–25% Cr; at least one element selected from the group consisting of Mo and W, the Mo when selected being in the range of 9–25%; the W when selected being in the range of 5–15% and the sum of Mo and W being in the range of 22% to less than 35%; about 2–10% Si; up to 300 parts per million C; up to 20% of elements selected from the group consisting of Fe and Co; with the balance nickel and incidental impurities and further characterized by the substantial absence of B and Pd.

2. The brazing alloy of claim 1 in which Cr is 15–22%; the sum of Mo and W is 22–30%; and Si is about 2–4%.

3. The brazing alloy of claim 2 in which Cr is about 16%; Mo is about 25%; W is about 5%; and Si is about 4%.

References Cited

UNITED STATES PATENTS

| | | | |
|---|---|---|---|
| 2,714,760 | 8/1955 | Boam et al. | 75—171 |
| 2,868,639 | 1/1959 | Gonser | 75—171 |
| 2,936,229 | 5/1960 | Shepard | 75—171 |

RICHARD O. DEAN, Primary Examiner